US007230175B2

(12) United States Patent
Whiteside

(10) Patent No.: US 7,230,175 B2
(45) Date of Patent: Jun. 12, 2007

(54) PORTABLE EXERCISER FOR STRINGED INSTRUMENT PLAYERS

(76) Inventor: Willis Whiteside, 2070 Hunters Trail Dr., Lawrenceville, GA (US) 30043

( * ) Notice: Subject to any disclaimer, the term of this patent is extended or adjusted under 35 U.S.C. 154(b) by 17 days.

(21) Appl. No.: 10/920,603

(22) Filed: Aug. 17, 2004

(65) Prior Publication Data

US 2005/0109196 A1 May 26, 2005

Related U.S. Application Data

(60) Provisional application No. 60/496,359, filed on Aug. 19, 2003.

(51) Int. Cl.
*G09B 15/06* (2006.01)

(52) U.S. Cl. .......................................... 84/465; 84/687

(58) Field of Classification Search .................. 84/465, 84/615, 653, 658, 687
See application file for complete search history.

(56) References Cited

U.S. PATENT DOCUMENTS

| | | | | |
|---|---|---|---|---|
| 1,848,920 | A * | 3/1932 | Watson | 84/173 |
| 4,031,801 | A * | 6/1977 | Cecchini | 84/465 |
| 4,065,995 | A * | 1/1978 | Greer | 84/465 |
| D284,203 | S * | 6/1986 | Landau | D19/62 |
| 5,033,351 | A * | 7/1991 | Nomura | 84/646 |
| 5,140,887 | A * | 8/1992 | Chapman | 84/646 |
| 5,398,585 | A * | 3/1995 | Starr | 84/646 |
| 5,756,914 | A * | 5/1998 | Streibl | 84/465 |
| 5,952,595 | A * | 9/1999 | Carnell | 84/465 |
| 6,127,615 | A * | 10/2000 | Rosenberg | 84/465 |
| 2005/0039592 | A1* | 2/2005 | Willard | 84/465 |

* cited by examiner

*Primary Examiner*—Lincoln Donovan
*Assistant Examiner*—David S. Warren
(74) *Attorney, Agent, or Firm*—Gardner Groff Santos & Greenwald

(57) ABSTRACT

A handle for grasping by one hand and a neck with a fingerboard for fingering with the other hand for use by stringed instrument players. The fingerboard is correlated to a section of the fret-board of a conventional stringed instrument such as a guitar, bass, or banjo. The fingerboard has string ridges that provide a pressure-resistant feel to simulate playing the corresponding string instrument. Example embodiments include a fingering device for acoustic guitar players that is a portable, single piece of lightweight, molded foam, a similar fingering device that is correlated to an electric bass, and similar fingering devices that provide audible feedback by producing sounds based on the notes played.

11 Claims, 19 Drawing Sheets

CLASSICAL ACOUSTIC GUITAR
( 6 OR 12 STRING)
(PRIOR ART)

ELECTRIC GUITAR
( 6 OR 12 STRING)
(PRIOR ART)

ELECTRIC BASS
( 4, 5 OR 6 STRING)
(PRIOR ART)

BANJO
(4, 5 OR 6 STRING)
(PRIOR ART)

MANDOLINE
(8 STRING)
(PRIOR ART)

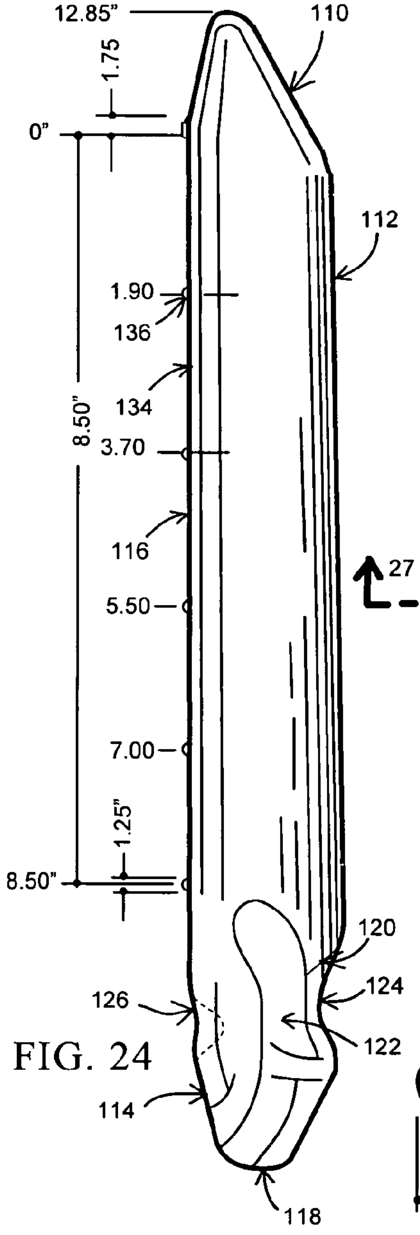
FIG. 24
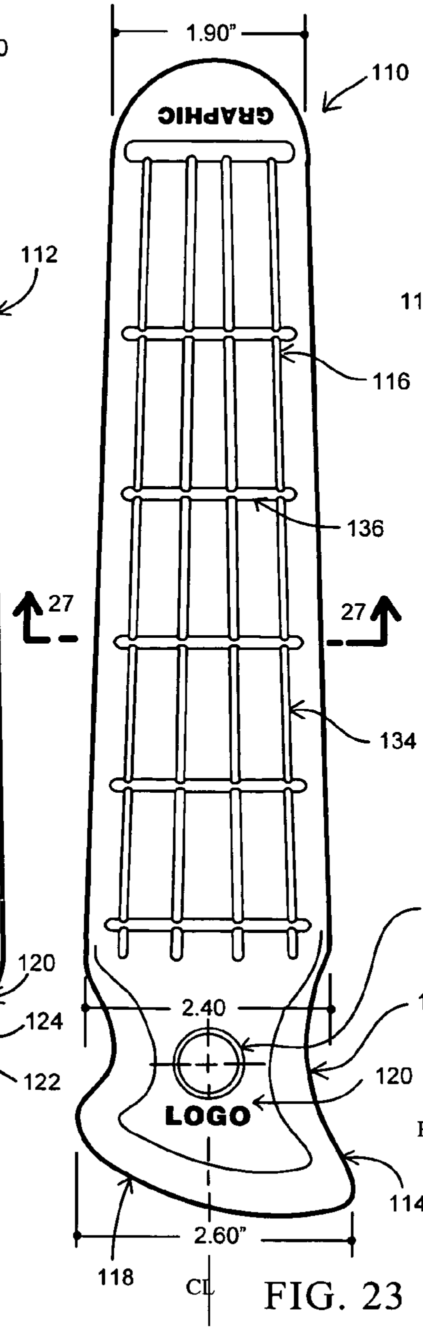
FIG. 23
FIG. 26
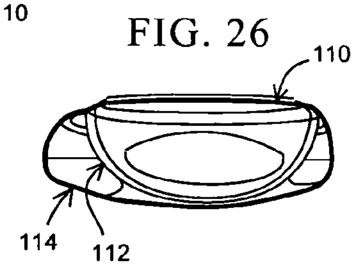
FIG. 27
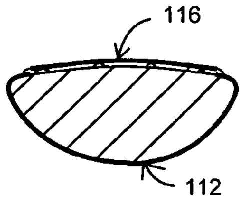
FIG. 25
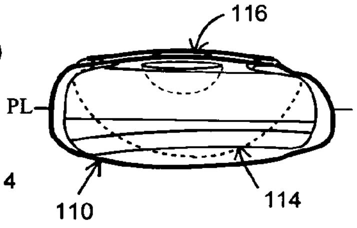

FIG. 28
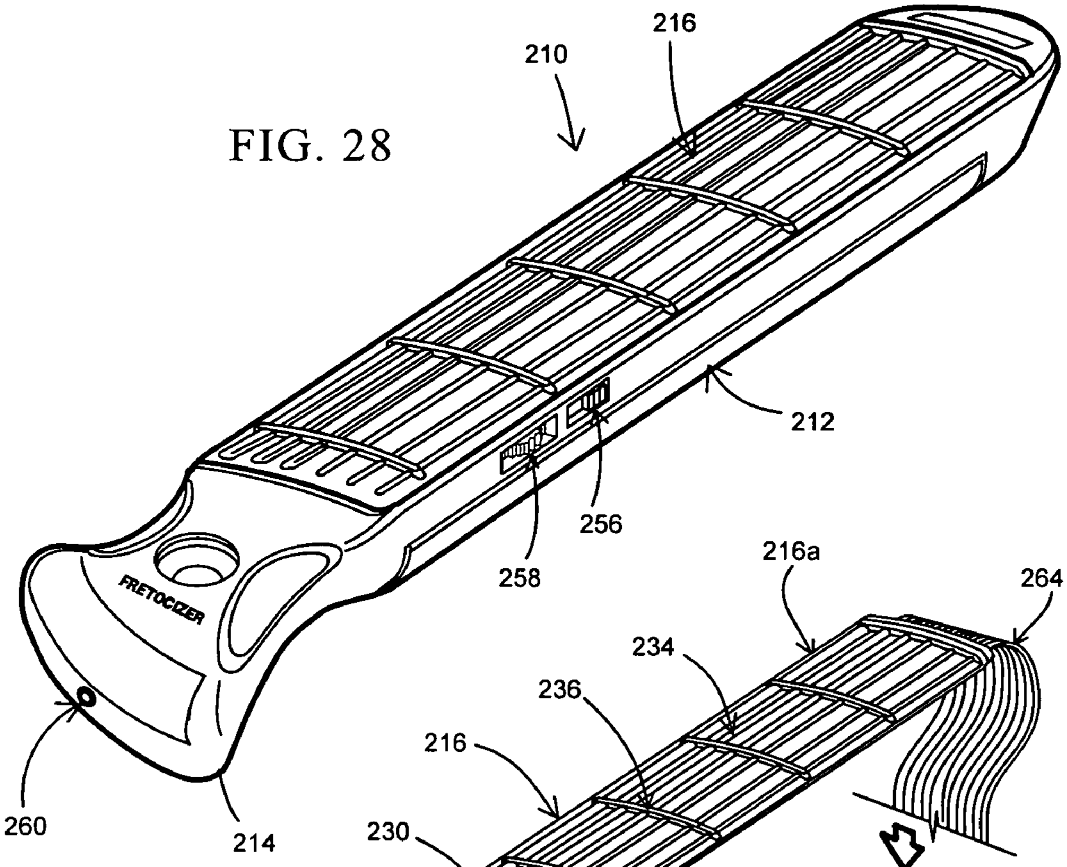
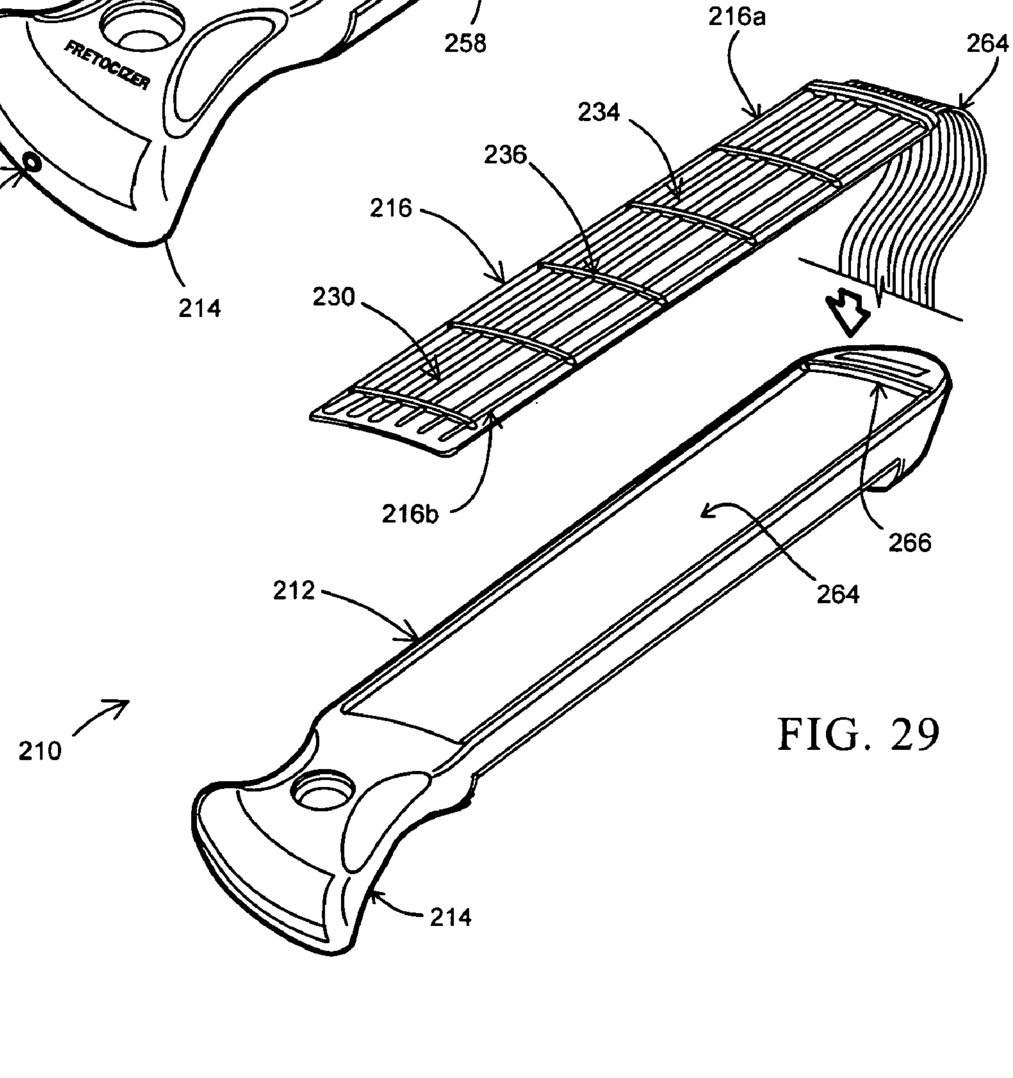
FIG. 29

PORTABLE EXERCISER FOR STRINGED INSTRUMENT PLAYERS

CROSS-REFERENCE TO RELATED APPLICATION

This application claims the priority benefit of U.S. Provisional Patent Application Ser. No. 60/496,359 filed Aug. 19, 2003, the entire scope and content of which is hereby incorporated herein by reference.

TECHNICAL FIELD

The present invention relates generally to exercise devices and, in particular, to portable exercise and practice devices for musicians.

BACKGROUND OF THE INVENTION

Before a playing session, players of stringed instruments usually warm up their hands and fingers by playing musical scales and/or by performing various string or instrument-neck exercises or routines to get up to full playing ability. The hands and fingers typically are stiffer or less limber in the hand muscles and tendons that manipulate the strings. Players must also play and practice regularly to develop and maintain finger-playing strength and dexterity. In addition, many players like to maintain skin-toughened or calloused fingertips and to practice fast single note scales and difficult chording (multiple musical notes) to maintain and improve their playing abilities. But stringed instrument players often cannot carry their instruments around with them many places that they go, and even when they can, they often have to play silently so as not to disturb other persons nearby. This is common for guitar players as well as for players of other stringed instruments including basses, banjos, mandolins, violas, and cellos.

Accordingly, there is a need for a way for stringed instrument players to exercise and practice fingering at times and places where they normally cannot have their instrument with them. It is to the provision of such a solution that the present invention is primarily directed.

SUMMARY OF THE INVENTION

The present invention includes finger exercise devices for string instrument players that are portable to permit practicing fingering at places and times when they cannot practice their instrument. The fingering devices each include a handle section for grasping and a neck section with a fingerboard for fingering. Preferably, the fingerboard has string ridges and fret ridges three-dimensionally embossed (raised) on it to correspond to the positions of strings and frets on a string instrument such as a guitar, bass, banjo, or mandolin.

In one aspect of the invention, there are provided fingering devices are lightweight and small (compared to the corresponding instruments) so that they are portable and can be taken and used in places where the user might not ordinarily be able to take his instrument. In another aspect of the invention, there are provided fingering devices that do not make a sound discernable to others when used so that they can be used in public and other places where the user normally would not be able to practice. And in yet another aspect of the invention, there are provided fingering devices with string ridges that provide the pressure-resistant feel of playing a real instrument to develop finger strength.

In a fingering device according to a first example embodiment, the neck, fingerboard, and handle are integrally made of a single piece of solid molded foam. The foam material has a hardness that creates pressure resistance to simulate pressing the real strings on a guitar. The fingerboard has six string ridges and five fret ridges and a nut ridge that correspond to the six strings and the first five frets and nut of a conventional six-string guitar. Another number of string ridges and fret ridges may be used to correspond to another string instrument and/or to produce a larger or smaller fingering device, as may be desired.

In a fingering device according to a second example embodiment, the fingerboard has four string ridges and five fret ridges that correspond to the four strings and the first five frets of a conventional four-string electric bass.

In a fingering device according to a third example embodiment, the handle and neck are a plastic shell with internal handle and neck chambers that house a sound assembly. The sound assembly includes a power source, a speaker, a headphones jack, and electronic components such as a circuit board with a sound processor and amplifier. In addition, the fingerboard is an electronic touch-sensitive keypad with sensor switches underlying the string ridge segments between the fret ridges. The sound assembly operates to drive the speaker to play a note correlating to the sensor under the string ridge depressed by the user. Headphones can be connected to the headphone jack so that sound only comes through the headphones and other persons nearby are not disturbed.

In a fingering device according to a fourth example embodiment, the handle and neck are made of a foam material, there are two speakers, and the string ridges are rigid and independently depressible pressure-sensitive sensor switches that operate the sound assembly to play the corresponding notes.

In addition to these fingering devices, the present invention provides a method for stringed instrument players to practicing fingering. The method includes grasping the handle of one of the fingering devices with one hand and pressing the string ridges of the fingerboard with the fingers of the other hand.

Accordingly, the present invention provides finger exercising devices that are portable and/or can be used without disturbing other persons, permitting stringed instrument players to exercise and practice fingering at times and places where they normally would not be able to. This allows users to get additional practice and exercise time that they otherwise wouldn't get, thereby improving their musical abilities.

The specific techniques and structures employed by the invention to improve over the drawbacks of the prior devices and accomplish the advantages described herein will become apparent from the following detailed description of the exemplary embodiments of the invention and the appended drawings and claims.

BRIEF DESCRIPTION OF THE DRAWINGS

FIG. 23 is a front view of a finger exercising device for electric bass players according to a second example embodi-ment of the present invention, showing modifications to correlate the fingering device to the electric bass of FIG. 22.

FIG. 24 is a bottom view of the fingering device of FIG. 23.

FIG. 25 is a handle end view of the fingering device of FIG. 23.

FIG. 26 is a neck end view of the fingering device of FIG. 23.

FIG. 27 is a cross section view taken at line 27—27 of the fingering device of FIG. 23, showing the embossed fret ridges and string ridges FIG. 28 is a front perspective view of a finger exercising device according to a third example embodiment of the present invention, which fingering device includes compo-nents for producing sounds corresponding to the notes fingered by the user.

FIG. 29 is a front perspective view of the fingering device of FIG. 28, showing the fingerboard being assembled onto the neck.

DESCRIPTION OF EXAMPLE EMBODIMENTS

Figure 1:
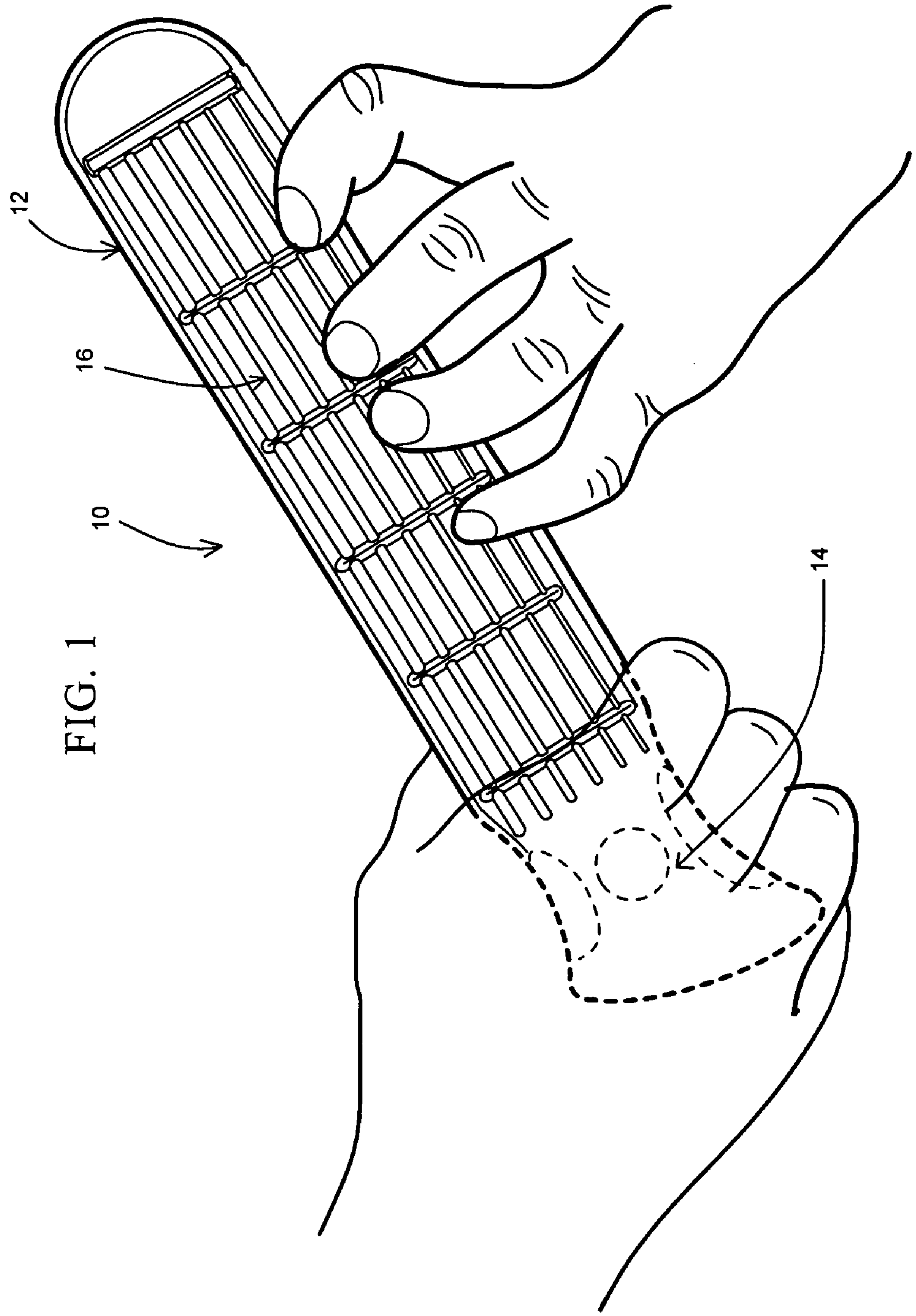
FIG. 1 is a front view of a finger exercising device for electric guitar players according to a first example embodiment of the present invention, showing its handle begin grasped and its neck fingerboard being fingered by a user.

Referring to the drawing figures, FIGS. 1–17 illustrate a portable finger exercising device 10 for guitar players according to a first example embodiment of the present invention. Generally described, the fingering device 10 comprises a neck section 12 and a handle section 14. The handle 14 is configured for comfortably holding it in the user's hand. And the neck 12 has a fingerboard 16 correlated to the fret board of aelectric guitar. It will be understood that the fingering device 10 may be alternatively provided with the neck 12 and fingerboard 16 configured to correlate to the neck and fret board of an acoustic guitar, electric bass, banjo, or mandolin, or even to a fretless stringed instrument such as a violin, viola, cello, or upright bass.

Figure 2:
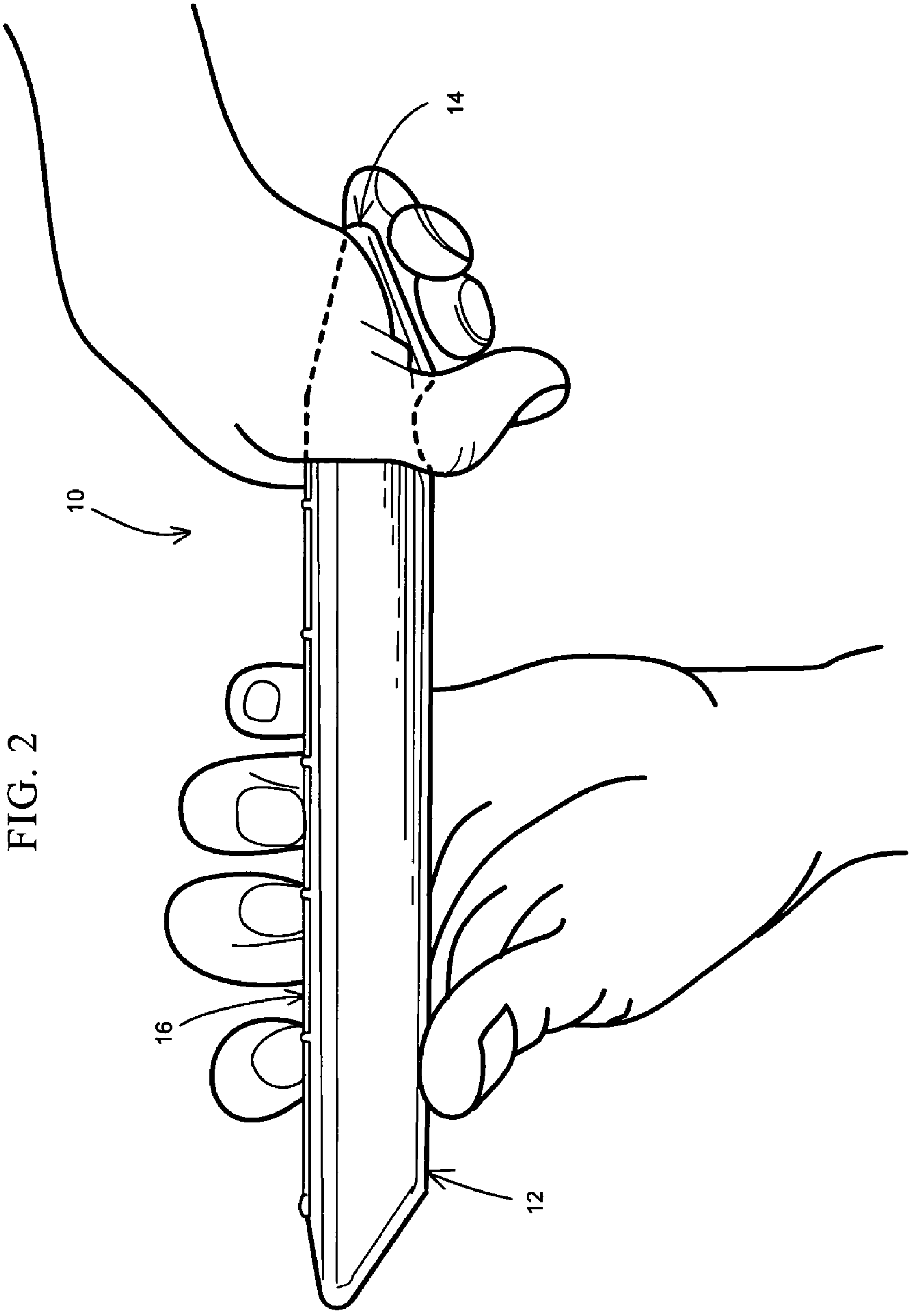
FIG. 2 is a top view of the fingering device in use of FIG. 1.
Figure 3:
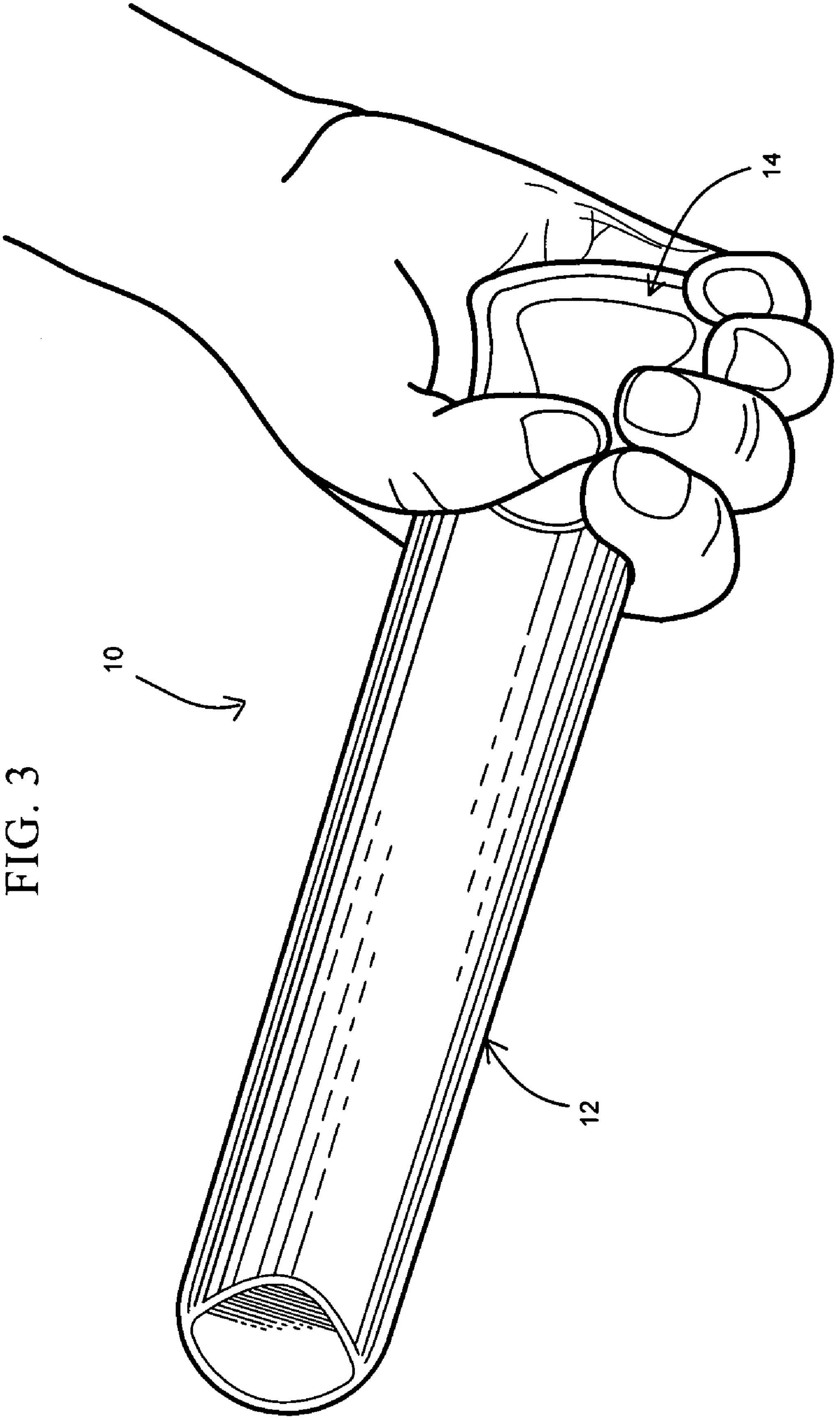
FIG. 3 is a rear view of the fingering device in use of FIG. 1.

FIGS. 1–3 show a method of using the fingering device 10 to practice fingering. The user grasps the handle 14 by one hand (typically the right hand) and uses the other hand to practice fingering on the fingerboard 16. In this way, the user can simulate playing a guitar to practice fingering individual notes and chords and to increase finger strength and dex-terity. The neck 12 and fingerboard 16 correspond to only a portion of the full length of the guitar neck and fret-board, so the fingering device 10 is much smaller and more portable that the guitar itself. As can be seen in the figures, when practicing on the device 10, the user's hands are less than one hand-width apart (for an average adult human).

Figure 4:
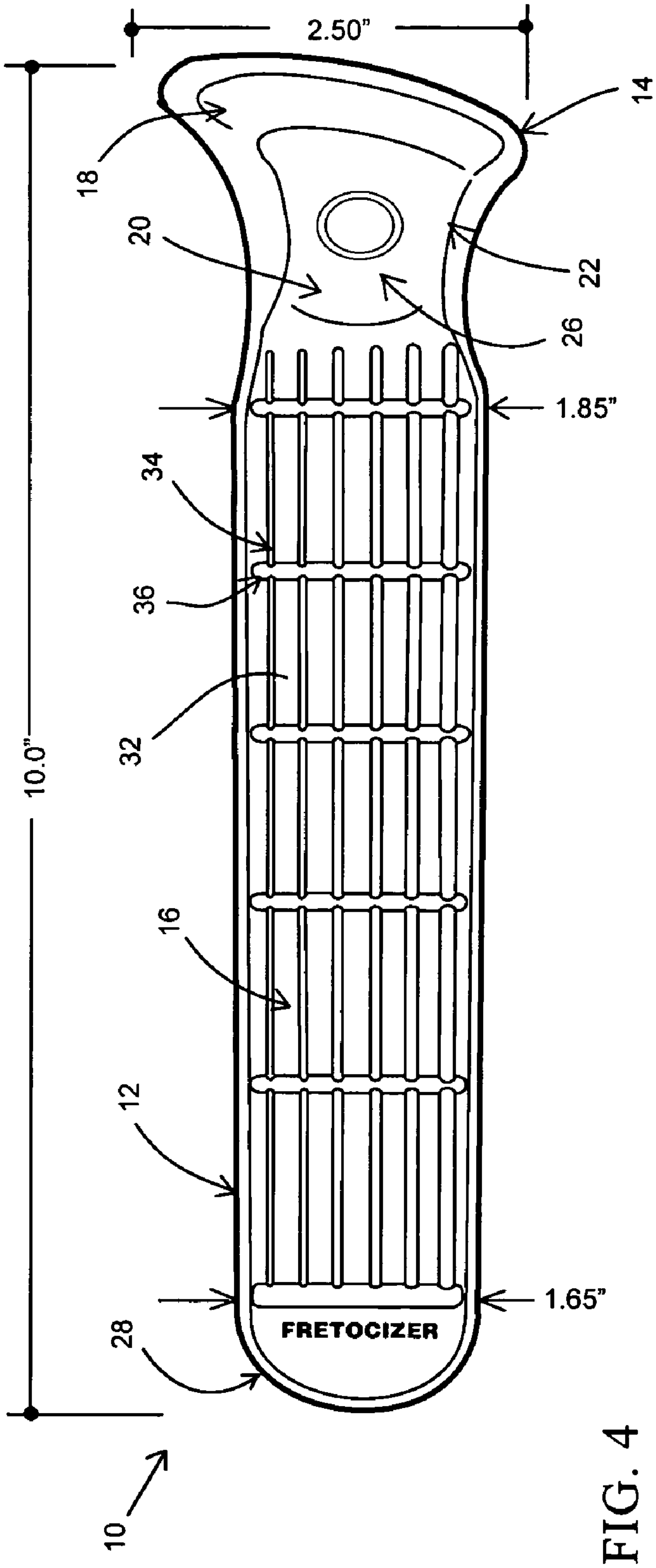
FIG. 4 is a front view of the fingering device of FIG. 1.
Figure 5:
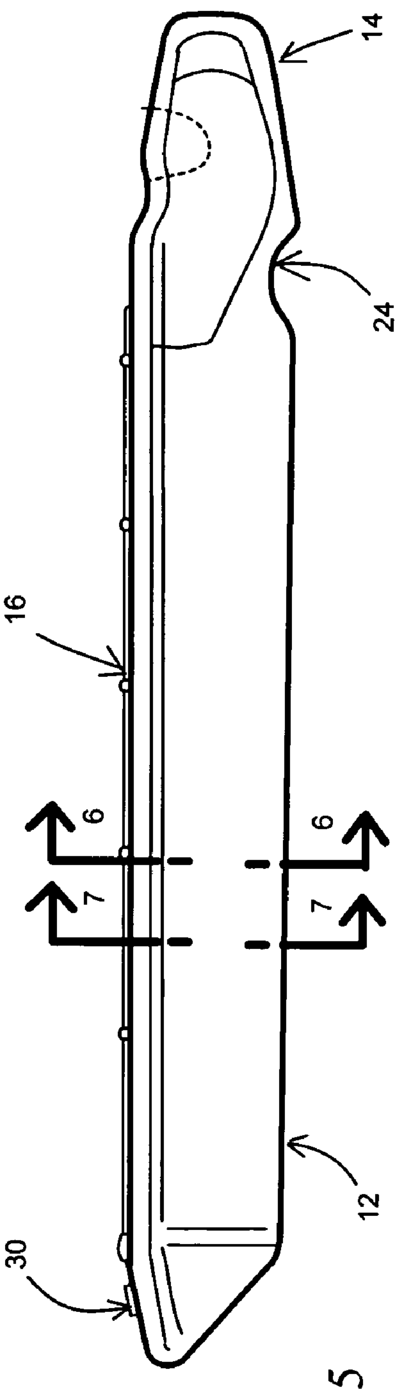
FIG. 5 is a top view of the fingering device of FIG. 4.
Figure 6:
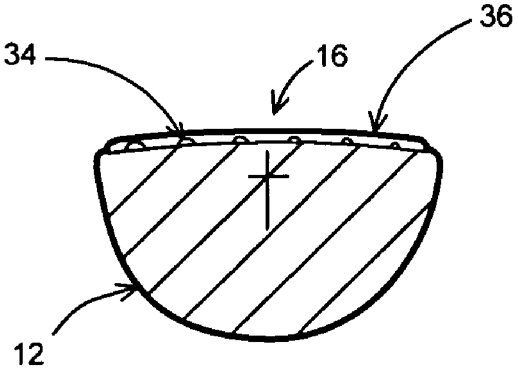
FIG. 6 is a cross section view taken at line 6—6 of the fingering device of FIG. 5.
Figure 8:
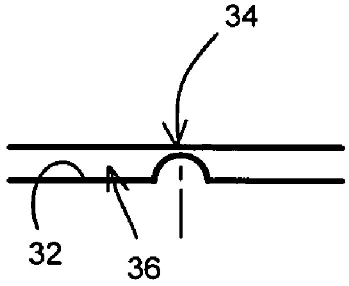
FIG. 8 is a detail view of a string ridge and a fret ridge of the fingering device of FIG. 6.
Figure 7:
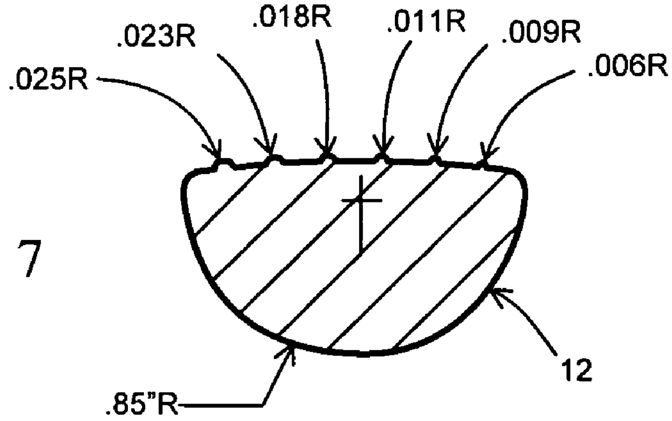
FIG. 7 is a cross section view taken at line 7—7 of the fingering device of FIG. 5.
Figure 9:
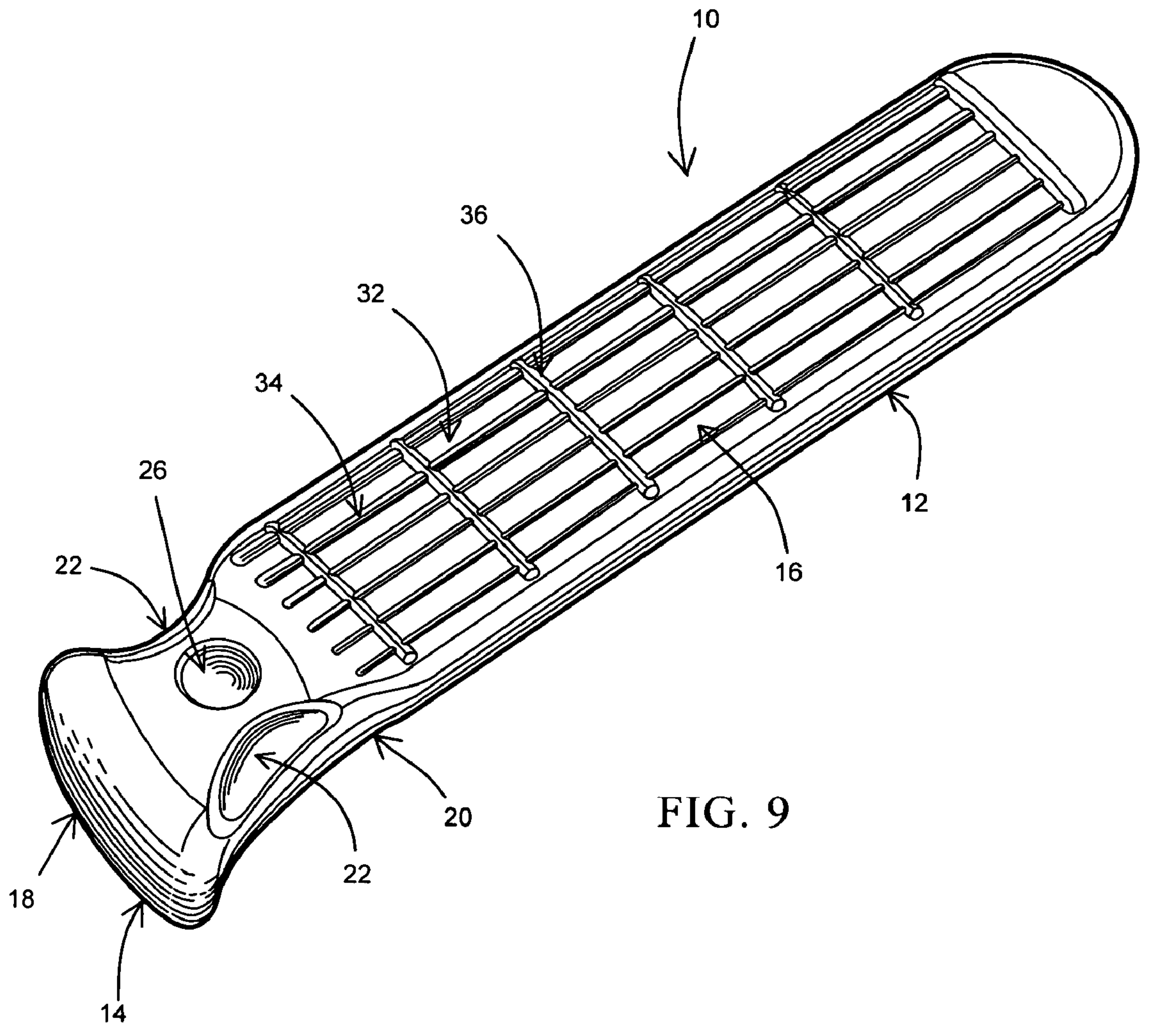
FIG. 9 is a front perspective view of the fingering device of FIG. 1.
Figure 10:
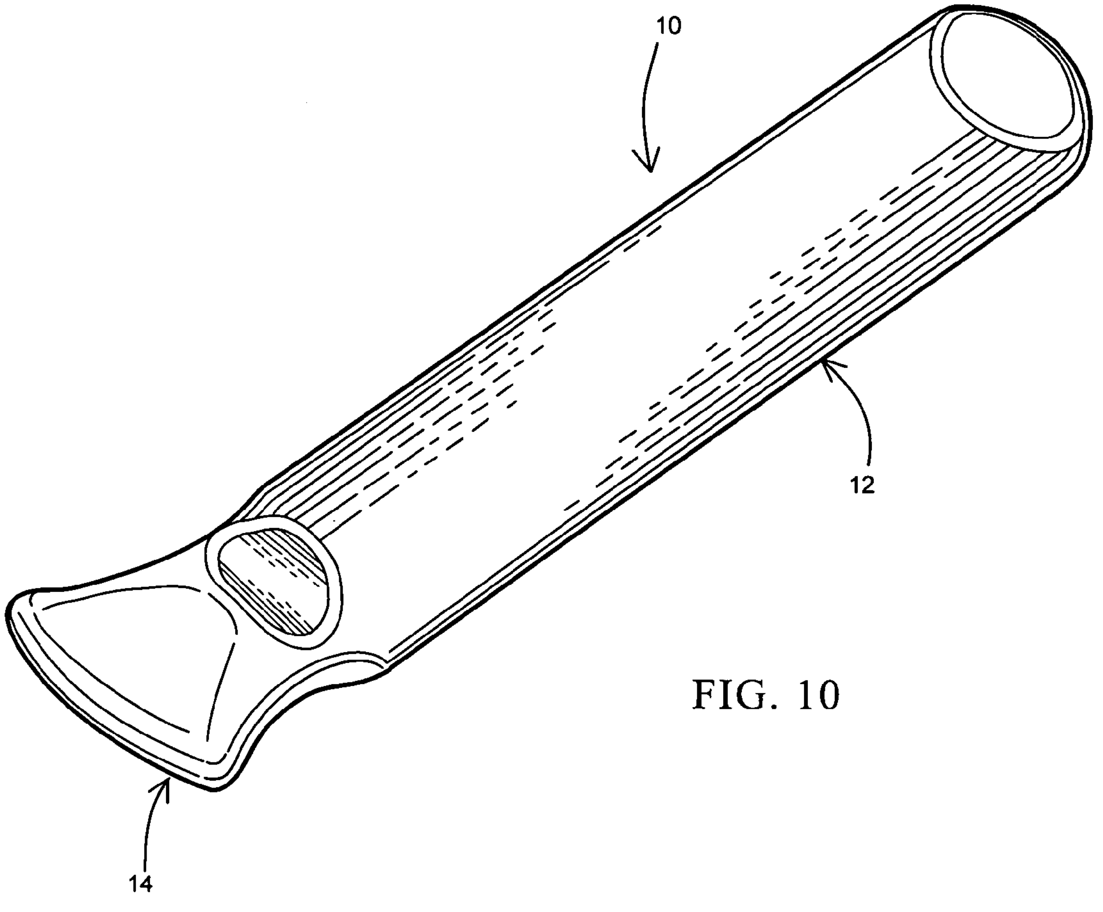
FIG. 10 is a rear perspective view of the fingering device of FIG. 1.
Figure 11:
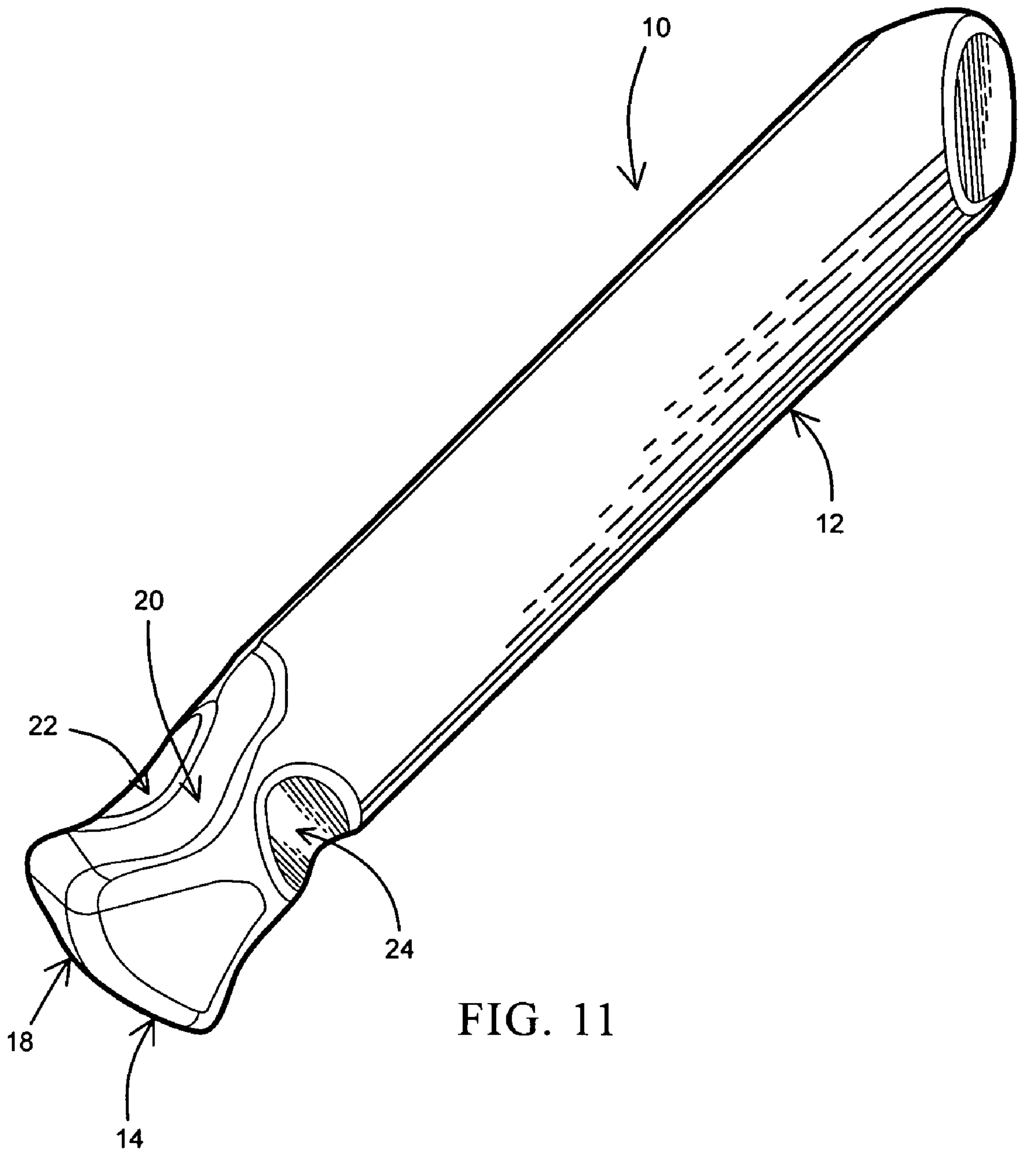
FIG. 11 is a bottom side perspective view of the fingering device of FIG. 1.
Figure 12:
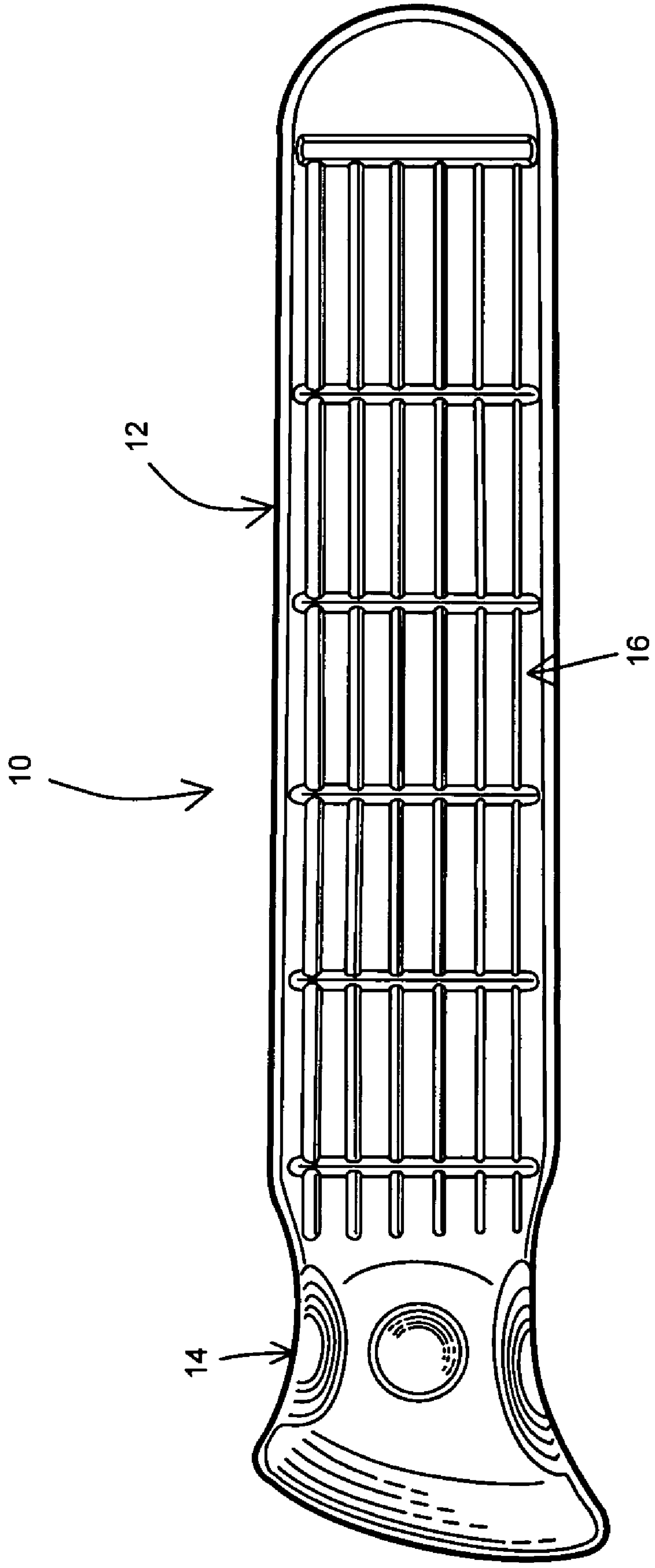
FIG. 12 is a front view of the fingering device of FIG. 1.
Figure 13:
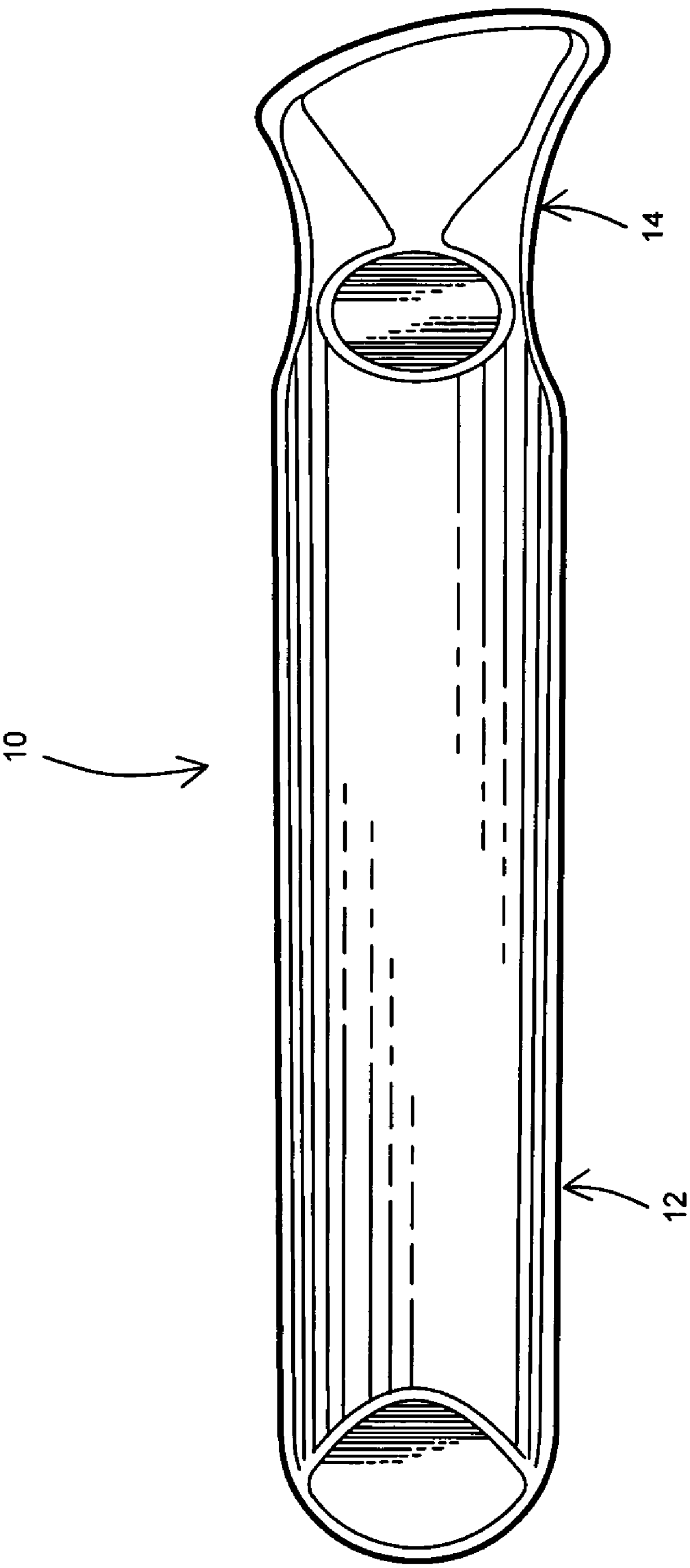
FIG. 13 is a rear view of the fingering device of FIG. 12.
Figure 14:
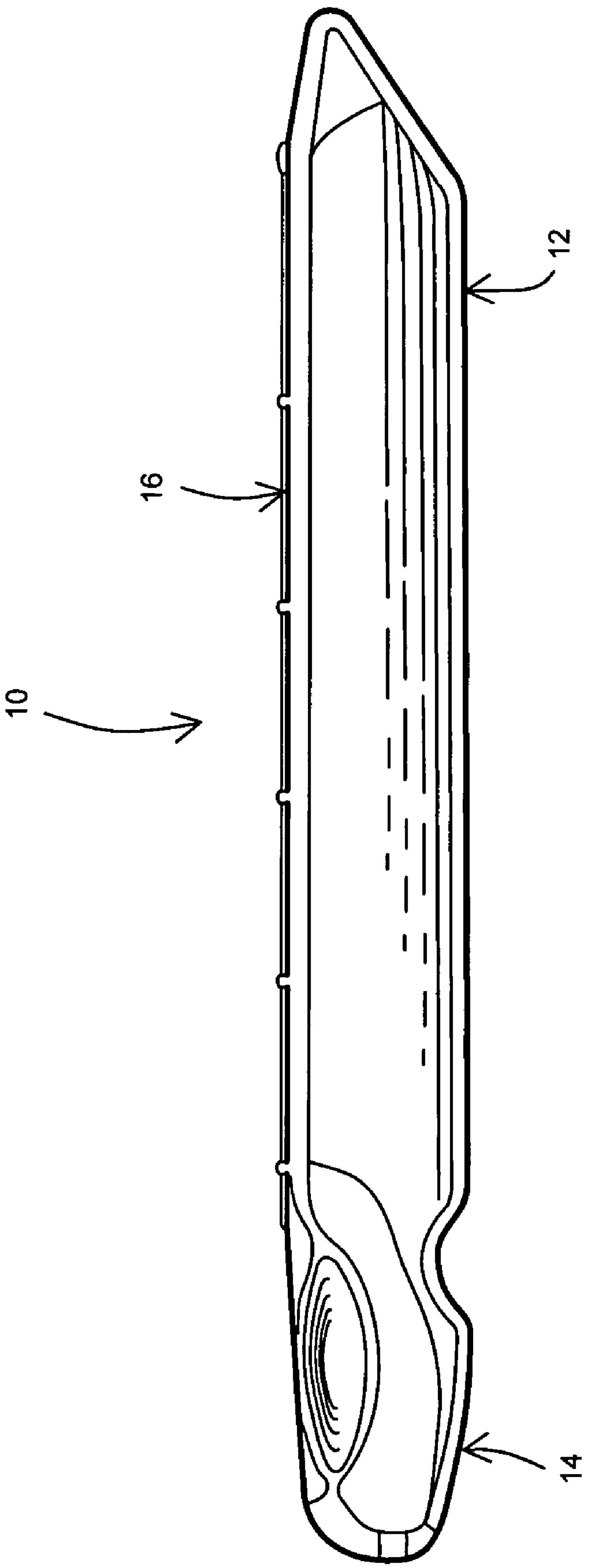
FIG. 14 is a bottom view of the fingering device of FIG. 12.
Figure 15:
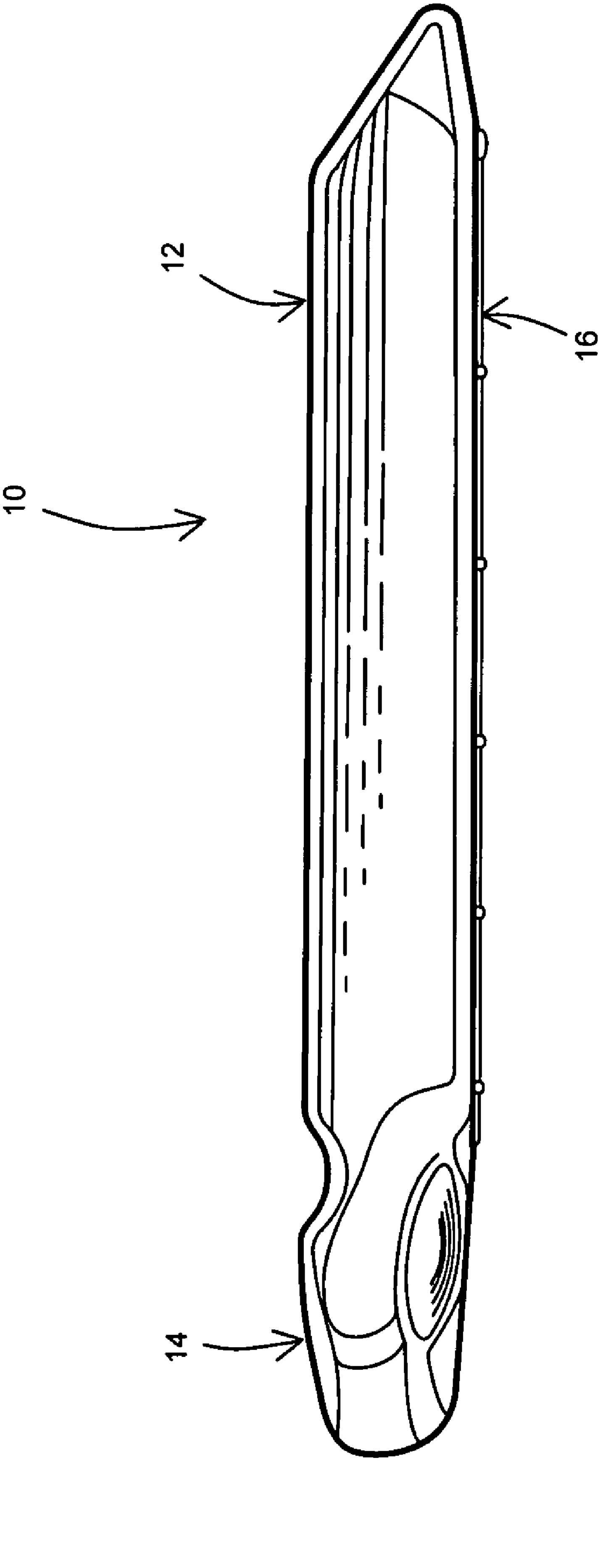
FIG. 15 is a top view of the fingering device of FIG. 12.
Figure 16:
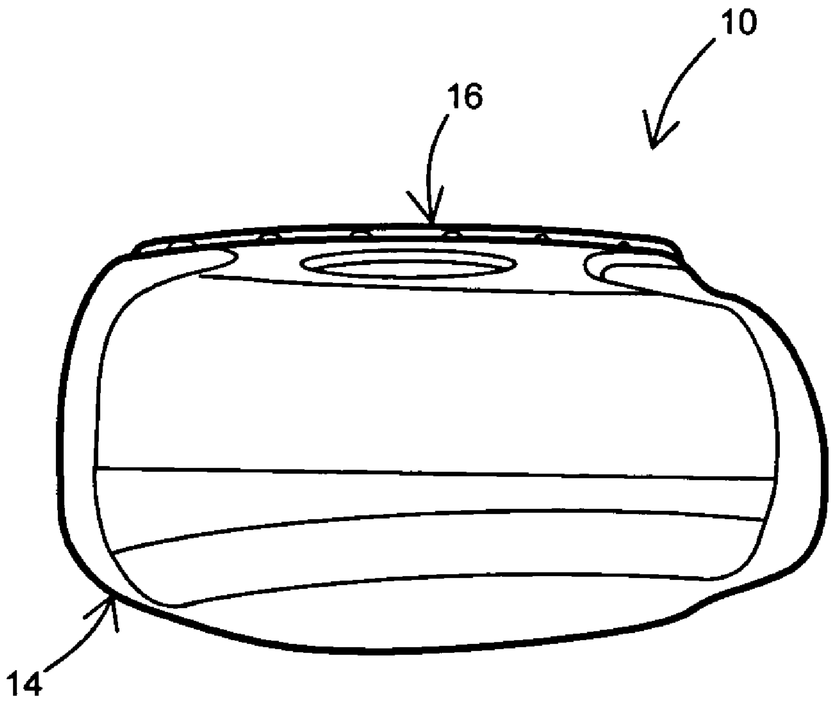
FIG. 16 is a left end view of the fingering device of FIG. 12.
Figure 17:
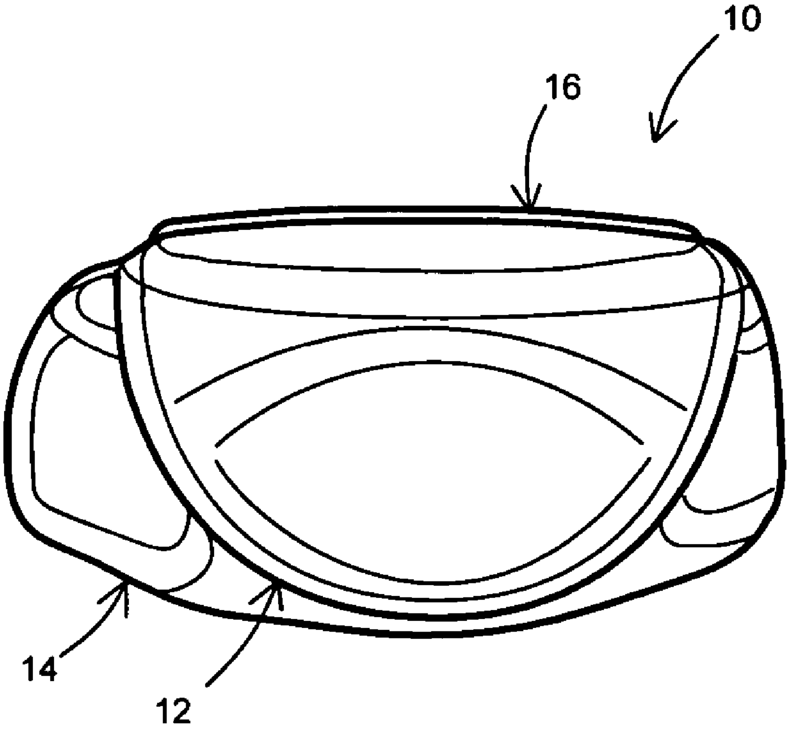
FIG. 17 is a right end view of the fingering device of FIG. 12.

FIGS. 4–17 show details of the construction of the fin-gering device 10. The dimensions (in inches) shown in FIGS. 4 and 7 are for a typical commercial embodiment, but are not limitations of the invention. Preferably, the handle 14, the neck 12, and the fingerboard 16 are a unitary piece made of a single body of material, with the fingerboard 16 formed on a front face of the neck section of the body. For example, the fingering device 10 can be injection molded or gravity molded of a foam material such as ethylvinylacetate (EVA), polyurethane, polyethylene, or another material. Preferably, the material is selected to have a surface hard-ness that provides a pressure resistance when the user squeezes string ridges on the fingerboard 16 with his fingers in order to simulate playing an actual guitar and strengthen the fingers. For example, the material is selected with a durameter (softness) that is preferably between about 25 and about 75, and that is most preferably about 50.

The handle 14 is configured for comfortably grasping by either of the player's hands, although it could be modified for use primarily by right-handed or left-handed persons. Preferably, the handle 14 has an end portion 18 and an intermediate portion 20 between the end portion and the neck 12. The end portion 18 may be wider and/or thicker than the intermediate portion 20, as shown, for comfort and stability in the player's hand. The intermediate portion 20 preferably has finger wrap recesses 22 at its front corners and a thumb wrap recess 24 in its back side for wrapping the player's fingers around the handle 14. In addition, the intermediate portion 20 preferably has a circular recess 26 in its front side in the fashion of a sound hole in the body of a guitar. Some users have taken to using the recess 26 for simulating string-picking with the handle hand, and it will be understood that this feature may be modified, or other features added, to facilitate such use.

Preferably, the neck 12 preferably has a generally semi-circular profile and is tapered slightly outward from its head end 28 to the handle 14. The head end 28 may have a brand name, logo, or other marking 30, such as "FRETOCIZER" or the trademark of a guitar manufacturer. On the front of the neck 12 is the fingerboard 16.

The fingerboard 16 is a generally planar surface 32 having three-dimensionally embossed string ridges 34, fret ridges 36 and a nut ridge. The string ridges 34 are parallel and arranged along the length of the fingerboard, and the fret ridges 36 are perpendicular and intersect the string ridges, to correspond to the strings and frets of a guitar. Preferably, the string ridges 34 have a generally semi-circular profile (see FIG. 8) and different sizes (see FIG. 7) to correspond to the different sizes of strings on a conventional guitar, going from a thicker bass string on top to a thinner string on bottom. Because of the material used (as described above), the string ridges 34 provide a tactile representation mimicking guitar strings so that they provide a pressure resistance for strengthening the player's fingers. If desired, the string ridges 34 may be made of or have a coating of a coarse material for creating and/or maintaining calloused fingertips on the player's fingering hand.

Figure 18:
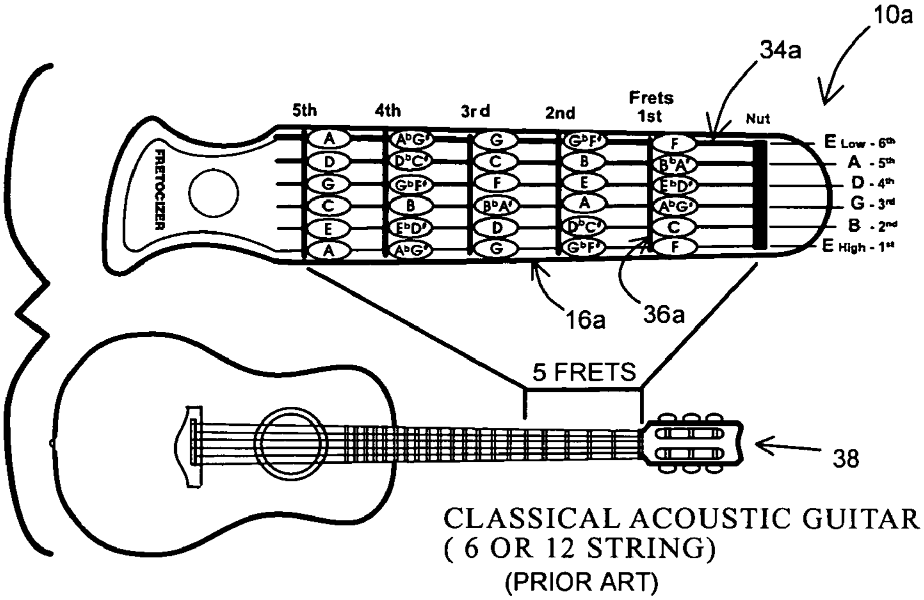
FIG. 18 is a front view of a fingering device of an alternative embodiment and a front view of a conventional acoustic guitar, showing the correlation of the fingerboard of the fingering device to the fret-board of the guitar.

FIG. 18 shows a fingering device 10*a* according to an alternative embodiment correlated to an acoustic guitar. The arrangement of the string ridges 34*a* and the fret ridges 36*a* (e.g., size, shape, number, and spacing) is selected to correspond to a conventional acoustic guitar 38. A conventional acoustic guitar 38 has an industry standard of 22 or 24 frets, which are shown as vertical lines and numbered starting at the far right nut and going to the left (up the neck). And a conventional acoustic guitar 38 has six strings, which are shown as horizontal lines ascending bottom-to-top and thinner-to-thicker, respectively. The first/bottom/little string is the high E and the sixth/top/big string is the low E, when open/unfretted.

In the alternative embodiment shown, the fingerboard 16*a* has five fret ridges 36*a* corresponding to the first five frets of a conventional guitar's neck. And the fingerboard 16*a* has six string ridges 34*a* corresponding to the six strings of a conventional acoustic guitar. The six string ridges 34*a* and five fret ridges 36*a*, and the fretted notes that are played by these on a conventional guitar, are labeled on the fingerboard 16*a* for reference. Alternatively, the fingerboard 16*a* can be provided with twelve string ridges 34*a* to correspond to a twelve string guitar. Of course, the fingerboard 16*a* could be provided in other arrangements, with more or less string ridges 34*a* and/or fret ridges 36*a*, as may be desired, and with the neck modified accordingly in size.

Figure 19:
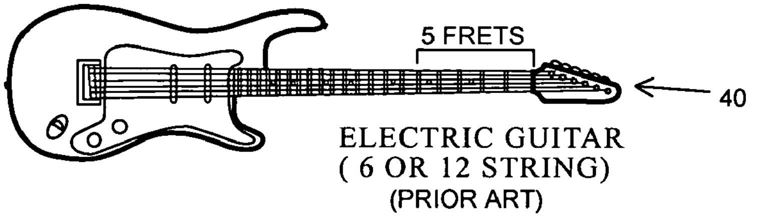
FIG. 19 is a front view of a conventional electric guitar, showing a fret-board section that corresponds to the finger-board of a fingering device of FIG. 1.

FIG. 19 shows a conventional electric guitar 40 with a fret-board to which the fingering device 10 of the first example embodiment is correlated. The neck and fingerboard for the fingering device 10 correlated to an electric guitar 40 is preferably a bit shorter, with the string ridges spaced slightly closer together, relative to the fingering device 10*a* correlated to an acoustic guitar 38.

In the first example and alternative embodiments for acoustic and electric guitar players, the fingering device is relatively lightweight and small, compared to a full-size guitar. This makes the device easily portable, and it can even be carried in the user's back pocket. In addition, the string ridges make no discernable sound when squeezed by the user. So guitar players can carry the fingering device around with them wherever they go and practice their fingering without disturbing others. In this way, guitar players can more often and more easily exercise the fingers to improve their fingering strength, speed, reach, and dexterity.

In other alternative embodiments, the fingering device 10 is of a multi-piece construction, is made by other fabrication techniques, and/or is made of other materials. In other alternative embodiments, the handle folds over onto or telescopes into the neck and is coupled to the neck so that the handle can be extended for use or retracted for compact storage and transportation. In still other alternative embodiments, the handle is movably coupled to the neck, with a lock to keep from moving when desired, so that the player can simulate strumming with his handle hand. And in yet another embodiment, the fingerboard is configured to simulate a full-sized neck, instead of just a portion of it, with the fingerboard made of multiple segments foldably hinged together or telescopically arranged into a compact unit for traveling and unfolded or opened up for use.

Figure 22:
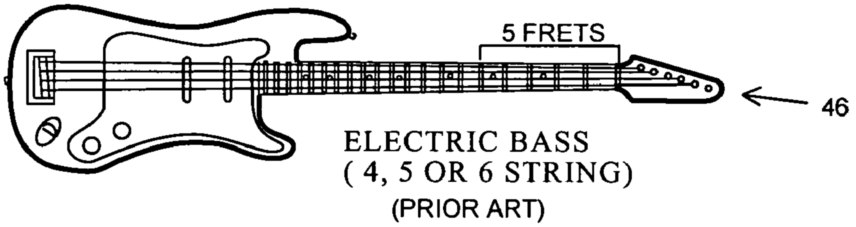
FIG. 22 is a front view of a conventional electric bass, showing a fret-board section that corresponds to a finger-board of a fingering device of a second example embodi-ment.
Figure 20:
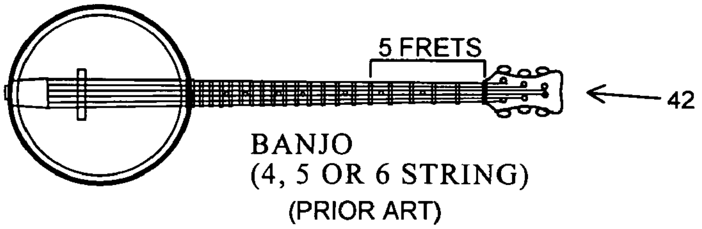
FIG. 20 is a front view of a conventional banjo, showing a fret-board section that corresponds to a fingerboard of a fingering device of an alternative embodiment.
Figure 21:
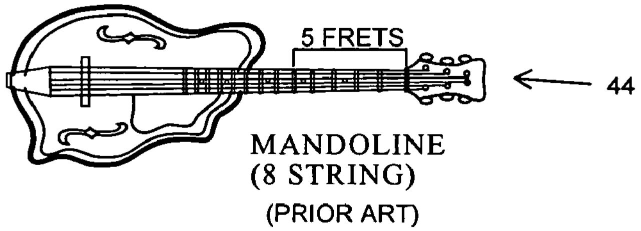
FIG. 21 is a front view of a conventional mandolin, showing a fret-board section that corresponds to a finger-board of a fingering device of an alternative embodiment.
Figure 30:
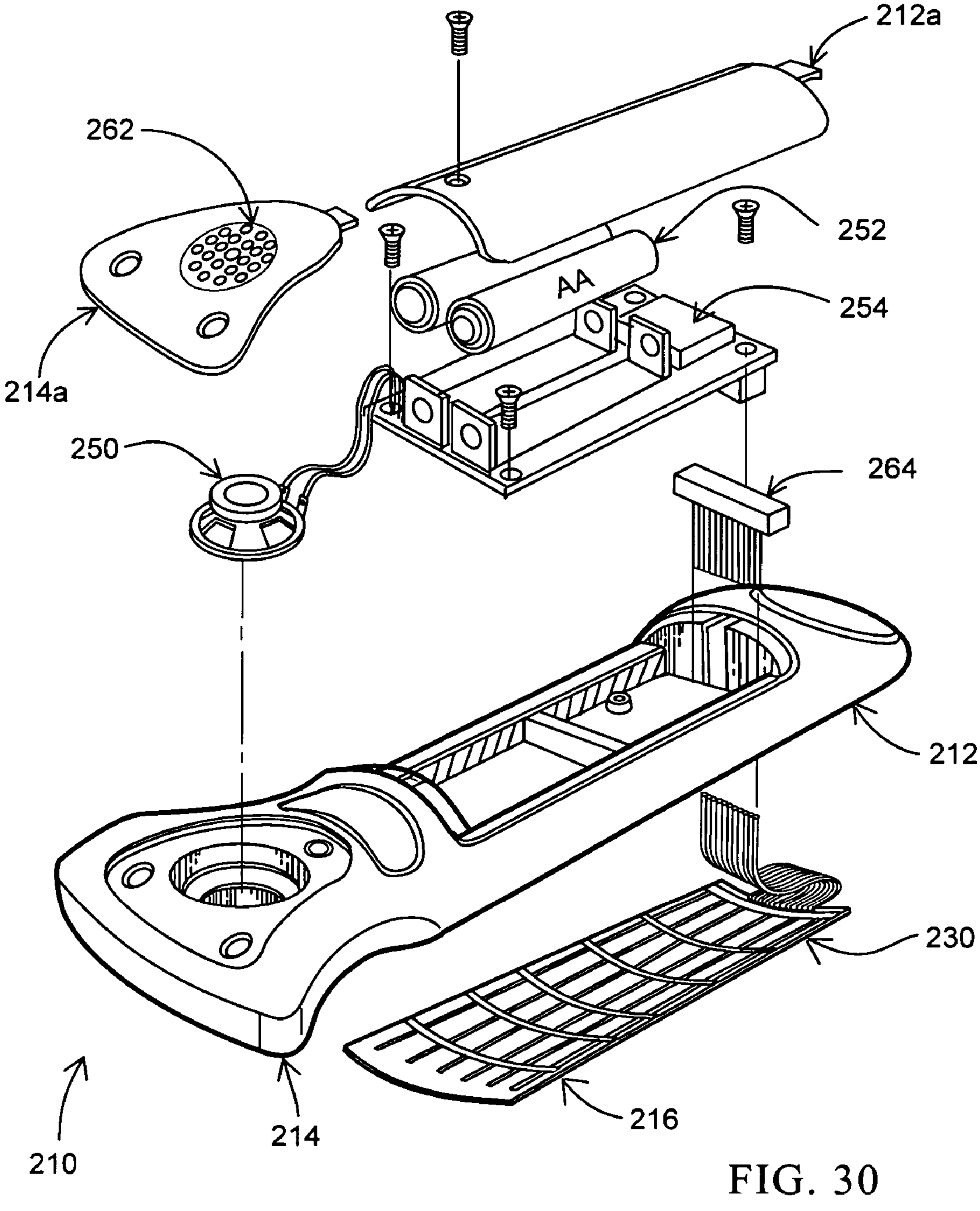
FIG. 30 is an exploded rear perspective view of the fingering device of FIG. 28, showing the major components of the fingering device.
Figure 31:
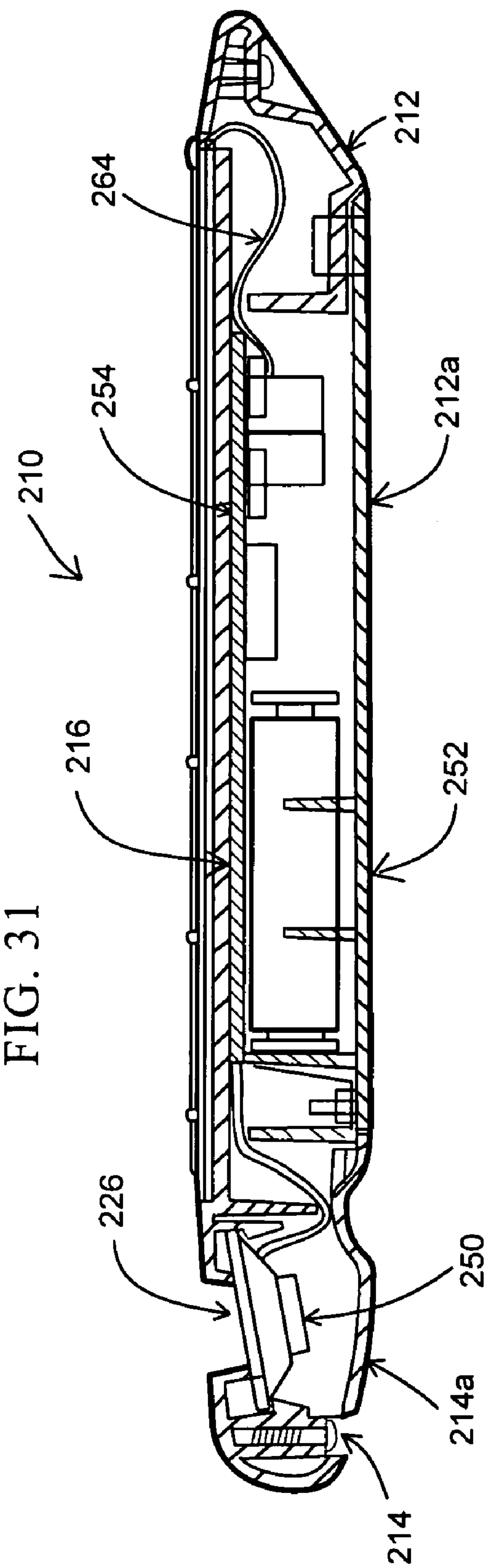
FIG. 31 is a longitudinal cross sectional bottom view of the fingering device of FIG. 28.
Figure 32:
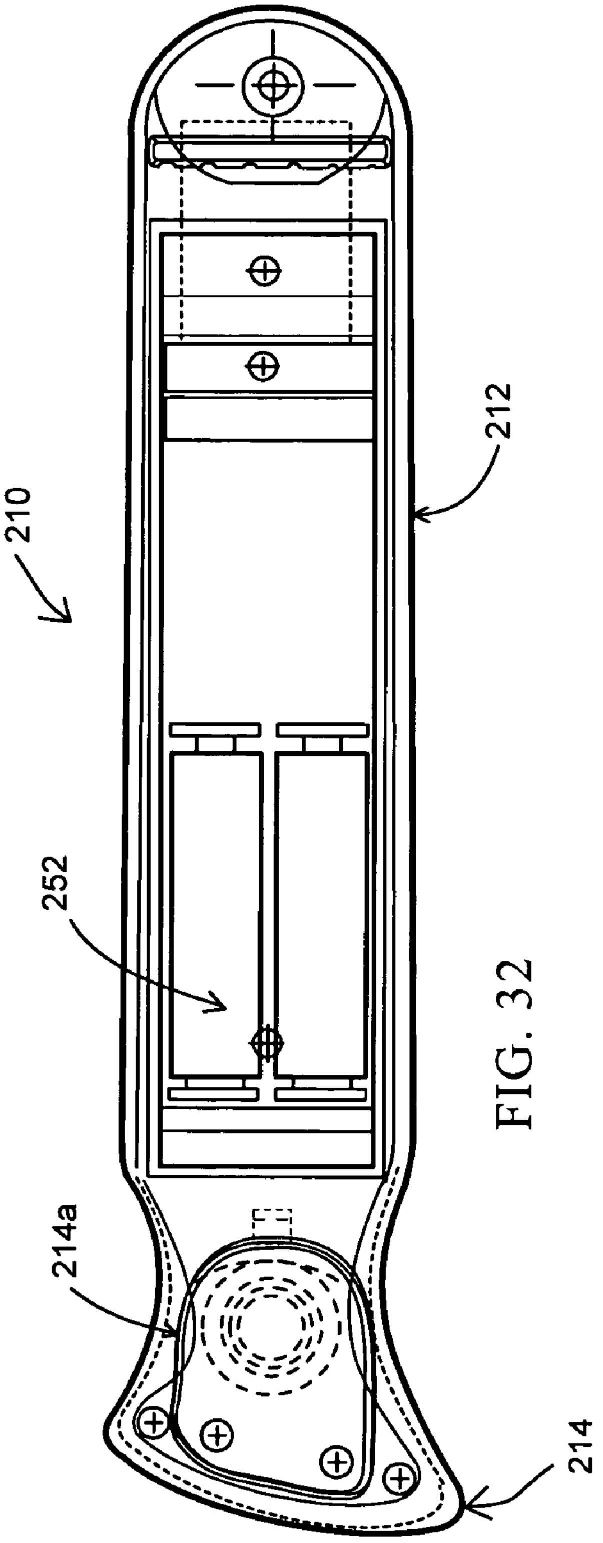
FIG. 32 is a rear view of the fingering device of FIG. 28, with the neck access panel removed.

Referring now to FIGS. 20–22, the invention includes fingering devices that are similar to that of the first example embodiment, except that they have fingerboards corresponding to the fret-boards of other stringed instruments. In such one embodiment, the fingerboard corresponds to the fret-board of a four, five, or six string banjo 42, shown in FIG. 20. In yet another embodiment, the fingerboard corresponds to the fret-board of an eight string mandolin 44, shown in FIG. 21. And in still in another embodiment, the fingerboard corresponds to the fret-board of a four, five, or six string electric bass 46, shown in FIG. 22. It will be understood that the invention can alternatively be provided with a fingerboard with string ridges, with or without fret ridges, that are correlated to another type of conventional stringed instrument.

As an example, FIGS. 23–27 show a fingering device 110 for bass players according to a second example embodiment of the invention. In this embodiment, the fingering device 110 has a handle 114 and a neck 112 with a fingerboard 116, similarly to that of the fingering device 10 of the first embodiment. The handle 114 has an end portion 118 and an intermediate portion 120, with finger and thumb wrap recesses 122 and 124 and a circular recess 126. The dimensions (in inches) shown, which include the distance of each fret ridge from the nut ridge, are for a typical commercial embodiment, but are not limitations of the invention.

In this embodiment, however, the fingerboard 116 is correlated to the fret-board of a conventional four-string electric bass (see FIG. 20). Thus, the fingerboard 116 has four equally spaced string ridges 134. In addition, the fingerboard 116 has five fret ridges 136, though more or less may be provided.

Referring now to FIGS. 28–32, there is shown a fingering device 210 according to a third example embodiment of the invention. The fingering device 210 is similar to the fingering device 10 of the first embodiment in that it has a neck 212, a handle 214, and a fingerboard 216. However, the fingering device 210 includes a sound assembly for producing sounds that correspond to the notes played by fingering the string ridges 234.

The sound assembly preferably includes sensors on the fingerboard 216, a speaker 250, a power source 252, and electronic components for driving the speaker to produce sounds corresponding to the position of the sensors on the fingerboard. The electronic components may include a printed circuit board (PCB) 254 with a sound processor and an amplifier, and controls such as an "on/off" switch 256 and a "volume" knob 258 wired to the PCB. In addition, the sound assembly preferably includes a jack 260 for connecting headphones, and the PCB is preferably configured to direct sound signals to the headphone jack but not the speakers when the headphones are connected, so that the user can practice without making a discernable sound that might disturb others. The speaker 250 may be a one inch waterproof sound speaker wired to the PCB. The power source 252 may include disposable or rechargeable batteries (e.g., two "AA" batteries or one 9-volt battery), a 120VAC cord, and/or an AC/DC adapter wired to the PCB. And the handle 214 and neck 212 are plastic and have removable access panels 214*a* and 212*a* covering internal chambers housing these components of the sound assembly. The speaker 250 is located in the handle 214 and aligned with a circular hole 226 with a grill on the front face of the handle, and/or the handle access panel 214*a* may have a grill 262 for covering the speaker.

The fingerboard 216 is a separate component, not formed integrally as the front face of the neck 212. The fingerboard 216 is mounted in a similarly sized and shaped recess 264 in the front face of the neck 214 and wired through a slot 266 to the PCB by a ribbon connector 264. The fingerboard 216 has string ridges 234 and fret ridges 236 three-dimensionally embossed of a pressure-resistance material on the fingerboard panel 230. The fingerboard panel 230 is an electronic touch-sensitive keypad with sensor switches positioned at and actuated by pressing each string ridge segment between each fret ridge. For example, depressing string ridge segment 216*a* (between the nut and the first fret) would actuate the underlying sensor that produces an "F" note, and depressing string ridge segment 216*b* (between the fourth and fifth frets) would actuate the underlying sensor that produces an "A" note (see FIG. 10). The user can play chords by depressing multiple string ridges segments simultaneously, and produce a vibrato effect by vibrating his fingertips on the ridge segments. The electronic touch-sensitive keypad with sensor switches 230 is preferably a membrane keypad of the type commercially available from companies such as SCHURTER ELECTRONIC COMPONENTS of Luzern, Switzerland, and PANNAM IMAGING of Cleveland, Ohio. If desired, the PCB may be integrally provided with the fingerboard panel 230 as a single unit. In alternative embodiments, the fingerboard 216 is flat with marked lines indicating the positions of the strings and frets (the strings and frets are not three-dimensionally embossed) and the sensors positioned under the string and fret lines.

Figure 34:
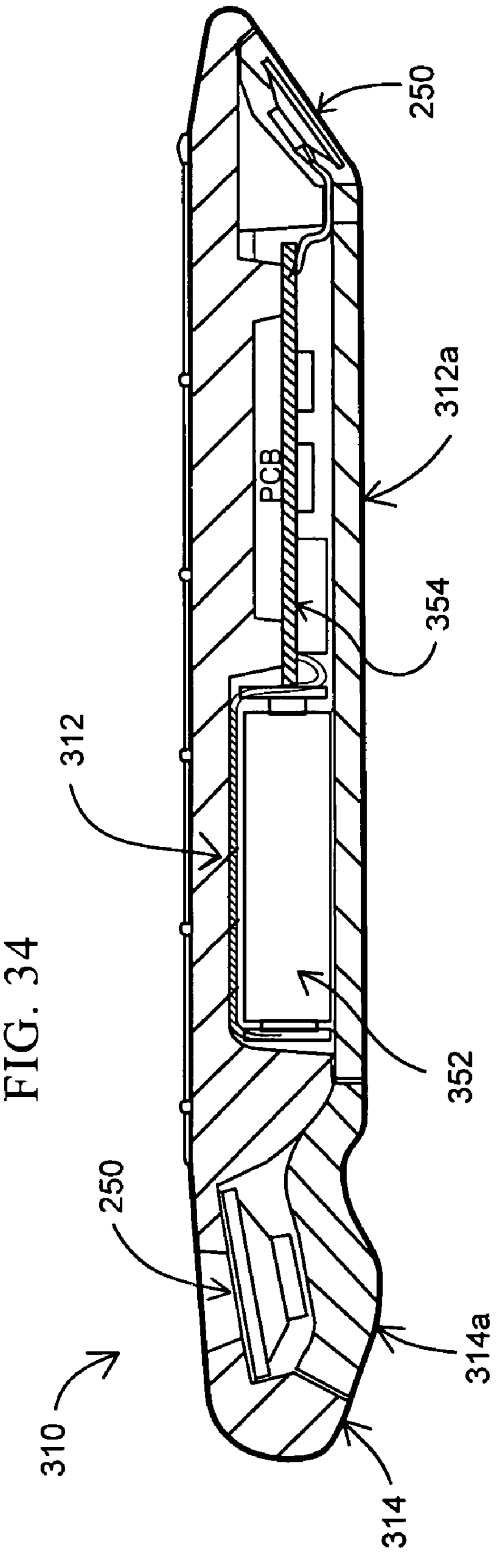
FIG. 34 is a longitudinal cross sectional bottom view of the fingering device of FIG. 28.
Figure 33:
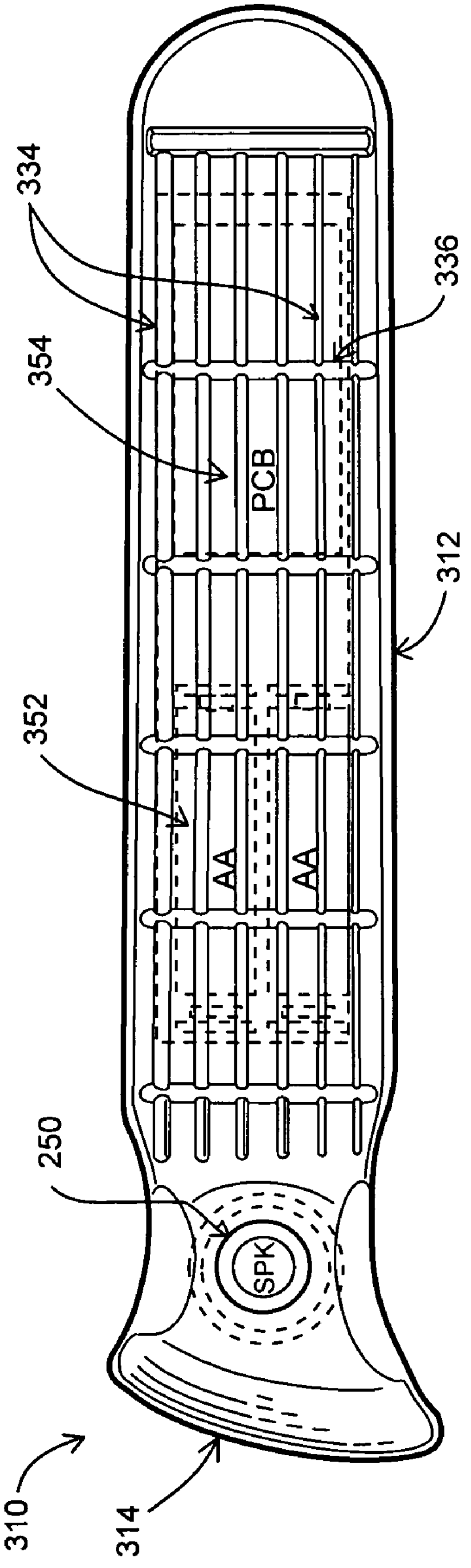
FIG. 33 is a front view of a finger exercising device according to a fourth example embodiment of the present invention, which fingering device includes components for producing sounds corresponding to the notes fingered by the user.

Referring now to FIGS. 33 and 34, there is shown a fingering device 310 according to a fourth example embodiment of the invention. The fingering device 310 is similar to the fingering device 210 of the third embodiment in that it has a neck 312, a handle 314, a fingerboard 316, and a sound assembly for producing sounds that correspond to the notes played by fingering the string ridges 334. Similarly, the sound assembly includes a power source 352, a PCB 354, a headphones jack (not shown), and controls (not shown). And the handle 314 and neck 312 have removable access panels 314*a* and 312*a* covering internal chambers housing these components of the sound assembly.

In this embodiment, however, the neck 312 and the handle 314 are molded of a foam material, and the sound assembly includes two speakers 250, one in the handle and one in the head end of the neck. In addition, the fingerboard 316 has embossed rigid string ridges 334 and fret ridges 336, with each string ridge segment between two of the fret ridges being an independently depressible sensor switch, that is, a pressure-sensitive button. Depressing one of the string ridge segments/pressure-sensitive buttons causes the corresponding note to be played by the speakers.

Advantageously, the present invention provides finger exercising devices that are safe and convenient exercise tools, are great for use when warming up before a gig, and can be easily transported anywhere for use. Because the fingering devices are portable, they can be used in a wide variety of circumstances, for example, the user can keep a unit in his desk drawer for use during down time at the office, on the coffee table for use while watching television, in his carry-on bag for use while traveling, etc. Use of the fingering devices and their practice techniques can be combined with the user's normal playing or practice schedule and can improve the player's balance between playing chords and single note playing ability. The fingering devices can build the user's stretch and reach to get to that high or low note and improve overall speed and song-playing ability. Combined with improving circulation, continued use can relieve those painful cramps and fatigue from repetitive playing. The fingering devices are a great stress reliever and can help relieve pain from hand cramps and finger-playing fatigue. The fingering devices can give the guitar or bass player that note-playing edge and speed that all players of stringed instruments strive for. The fingering devices can be used by musicians of all skill levels.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be unnecessarily limiting of the claimed invention. In addition, as used in the specification and the appended claims, the singular forms "a," "an," and "the" include the plural, plural forms include the singular, and reference to a particular numerical value includes at least that particular value, unless the context clearly dictates otherwise. Furthermore, any methods described herein are not intended to be limited to the sequence of steps described but can be carried out in other sequences, unless expressly stated otherwise herein. And any use of the term "or" herein is to be construed to mean "and/or".

While certain embodiments are described above with particularity, these should not be construed as limitations on the scope of the invention. It should be understood, therefore, that the foregoing relates only to exemplary embodiments of the present invention, and that numerous changes may be made therein without departing from the spirit and scope of the invention.

What is claimed is:

1. A finger exercising device for players of stringed instruments, comprising:

a) an integrally formed single body of material defining a handle, a neck extending from the handle and having a front face, and a fingerboard on the front face of the neck;

b) the handle configured for grasping by a strumming hand of the player, wherein the handle has an end portion and an intermediate portion between the end portion and the neck, the end portion having a larger thickness or width dimension than the intermediate portion, the intermediate portion having a rear face on an opposite side of the body of the front face and defining at least one finger or thumb wrap recess for wrapping fingers of the strumming hand around the handle, wherein when the user holds the handle in the strumming hand the fingerboard registers to a position oriented for use by a fingering hand of the player;

c) the fingerboard configured to correlate to only a partial length of a fret-board of the stringed instrument for practicing fingering by the fingering hand of the player, wherein the fingerboard includes embossed string ridges and embossed fret ridges corresponding to strings and frets of the fret-board of the stringed instrument; and d) the body material selected so that the string ridges have a hardness and resiliency that provides a tactile pressure resistance when the player presses on them with fingers of the fingering hand such that each section of the string ridges between two of the fret ridges is resiliently depressible independent of all the other string ridge sections, wherein the hardness and resiliency are selected for mimicking the feel and pressure of fingering the stringed instrument without regard to pressure needed to close switches and produce sounds, wherein the tactile pressure resistance is substantially the same as actual resistance of the strings of the fret-board of the stringed instrument in order to simulate fingering the stringed instrument but without making any discernable sound.

2. The fingering device of claim 1, wherein the fingerboard is arranged to correlate to a guitar, a bass, a banjo, or a mandolin.

3. The fingering device of claim 1, wherein the body material has a durameter in the range of about 25 to about 75.

4. The fingering device of claim 3, wherein the body material has a durameter of about 50.

5. The fingering device of claim 1, wherein the body material is a foam selected from the group consisting of ethylvinylacetate, polyurethane, and polyethylene.

6. The fingering device of claim 1, wherein the body material is a foam selected from the group consisting of ethylvinylacetate, polyurethane, and polyethylene, and the body material has a durameter in the range of about 25 to about 75, wherein when the player depresses the string ridges there is no discernable sound made.

7. The fingering device of claim 1, wherein the neck has a distal end that is opposite the handle and that is tapered when viewed in a top view, wherein the tapered end permits the neck end to slide easily into a pant's back pocket.

8. The fingering device of claim 7, wherein the neck end is semi-circular when viewed in a front view, wherein the semi-circular neck end slides easily into the pocket.

9. A method of practicing fingering, comprising the steps of:

a) providing the fingering device of claim 1;

b) grasping the handle by the strumming hand;

c) pressing on the fingerboard with fingers of the fingering hand, with the fingering and strumming hands positioned less than one hand-width apart.

10. A finger exercising device for players of stringed instruments, comprising:

a) an integrally formed single body of material defining a handle, a neck extending from the handle and having a front face, and a fingerboard on the front face of the neck;

b) the handle configured for grasping by a strumming hand of the player, wherein the handle has an end portion and an intermediate portion between the end portion and the neck, the end portion having a larger thickness or width dimension than the intermediate portion, the intermediate portion having a rear face on an opposite side of the body of the front face and defining at least one finger or thumb wrap recess for wrapping fingers of the strumming hand around the handle, wherein when the user holds the handle in the strumming hand the fingerboard registers to a position oriented for use by a fingering hand of the player;

c) the fingerboard configured to correlate to only a partial length of a fret-board of the stringed instrument for practicing fingering by the fingering hand of the player, wherein the fingerboard includes embossed string ridges and embossed fret ridges corresponding to strings and frets of the fret-board of the stringed instrument;

d) the neck having a distal end that is opposite the handle and that is tapered when viewed in a top view, or semi-circular when viewed in a front view, or both, wherein the tapered end permits the neck end to slide easily into a pant's back pocket; and e) the body material selected so that the string ridges have a hardness and resiliency that provides a tactile pressure resistance when the player presses on them with fingers of the fingering hand such that each section of the string ridges between two of the fret ridges is resiliently depressible independent of all the other string ridge sections, wherein the hardness and resiliency are selected for mimicking the feel and pressure of fingering the stringed instrument without regard to pressure needed to close switches and produce sound, wherein the tactile pressure resistance is substantially the same as actual resistance of the strings of the fret-board of the stringed instrument in order to simulate fingering the stringed instrument, wherein the body material is a foam selected from the group consisting of ethylvinylacetate, polyurethane, and polyethylene, and the body material has a durameter in the range of about 25 to about 75, wherein when the player depresses the string ridges there is no discernable sound made.

11. The fingering device of claim 10, wherein the fingerboard is arranged to correlate to a guitar, a bass, a banjo, or a mandolin.

* * * * *